(12) United States Patent
Brost et al.

(10) Patent No.: US 9,017,838 B2
(45) Date of Patent: Apr. 28, 2015

(54) SPINNING ELECTRODE FUEL CELL

(75) Inventors: Ron Brost, Dearborn, MI (US); William Schank, Howell, MI (US); James Waldecker, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 11/285,544

(22) Filed: Nov. 21, 2005

(65) Prior Publication Data

US 2007/0117002 A1 May 24, 2007

(51) Int. Cl.
*H01M 8/04* (2006.01)
*H01M 8/24* (2006.01)
*H01M 8/00* (2006.01)
*H01M 8/02* (2006.01)

(52) U.S. Cl.
CPC .............. *H01M 8/241* (2013.01); *H01M 8/004* (2013.01); *H01M 8/0273* (2013.01); *H01M 8/242* (2013.01); *H01M 8/2475* (2013.01); *Y02E 60/50* (2013.01)

(58) Field of Classification Search
None
See application file for complete search history.

(56) References Cited

U.S. PATENT DOCUMENTS

| 5,830,593 | A | 11/1998 | Nielson |
| 6,344,290 | B1 | 2/2002 | Bossel |
| 6,379,828 | B1 | 4/2002 | Worth |
| 2006/0093883 | A1* | 5/2006 | Pristash ......................... 429/30 |

FOREIGN PATENT DOCUMENTS

JP          2005-190858          *   7/2005

* cited by examiner

*Primary Examiner* — John S. Maples
(74) *Attorney, Agent, or Firm* — Damian Porcari Tung & Associates

(57) ABSTRACT

A spinning electrode fuel cell is disclosed. The spinning electrode fuel cell includes a housing and a stacked disk assembly which is rotatably mounted in the housing. The stacked disk assembly includes multiple electrochemical cells connected to each other. A motor engages the stacked disk assembly for rotating the stacked disk assembly in the housing. A fuel flow pathway is provided in the housing for distributing a fuel to the electrochemical cells. An oxidant flow pathway is provided in the housing and physically separated from the fuel flow pathway for distributing an oxidant to the electrochemical cells. A method of fabricating a fuel cell is also disclosed.

13 Claims, 1 Drawing Sheet

SPINNING ELECTRODE FUEL CELL

FIELD OF THE INVENTION

The present invention relates to fuel cells. More particularly, the present invention relates to a spinning electrode fuel cell which includes rotating electrodes to reduce adverse effects of resistance to gas diffusion while maintaining separation between the fuel and oxidizing agent in the fuel cell.

BACKGROUND OF THE INVENTION

Fuel cell technology potentially provides clean and efficient energy for stationary and traction applications. A functioning fuel cell, as any other electrochemical device, requires a series of components that provide the key functions of reactant distribution (mass transport), catalytic reactivity, ionic separation, and current collection. To date, however, the efficiency of fuel cell systems remains well below its theoretical maximum due to implementation practices that result in system components that provide the means of delivering the key functions but concurrently increase the polarization of the cell (reduction in voltage due to impedance of current) due to inefficiencies of design.

Recently, incremental improvements to fuel cell design have substantially reduced polarization contributed through component properties; for example, permeable membrane technologies have been developed that provide thinner yet more robust membranes that are of lower resistance, catalyst alloys are being developed that reduce the loading necessary to achieve a given current density, and manufacturing techniques that use stamped metal plates or innovative carbon-manufacturing methods are used to improve the efficiency of the current collection. Improvements to the reactant distribution, however, have focused on flow field design and pressurization of gases. While these techniques sometimes improve the fuel/oxidant utilization, they come at a cost of reduced efficiency (from increased fluid resistance) or increased complexity (from additional components that require installation and their weight and cost).

A well-known means which is used to reduce the effects of mass transport in electrochemical systems is to use the "spinning disk" or "spinning band" technique, in which at least one of the electrodes is rotated at high speed so that concentration gradients which are established due to resistance to mass transport (diffusion) are greatly reduced by hydrodynamically varying the rate at which electroactive species are brought to the outer surface of the diffusion layer. These types of electrodes are typically used normally in liquid media for small single cells. However, in the "spinning disk" type of fuel cell electrode arrangement, the fuel and the oxidizing agent are typically not separately maintained.

Therefore, a spinning electrode fuel cell is needed in which the electrodes of the fuel cell are rotated to reduce adverse effects of resistance to gas diffusion and in which separation between the fuel and oxidizing agent in the fuel cell is maintained. Such a spinning electrode fuel cell would extend the usefulness of the spinning electrode arrangement to liquids and eliminate the predisposition of the system to extreme crossover currents, thus allowing the use of conventional catalysts.

SUMMARY OF THE INVENTION

The present invention is generally directed to a spinning electrode fuel cell. The spinning electrode fuel cell includes a housing. A stacked disk assembly is rotatably mounted in the housing and includes multiple electrochemical cells connected to each other. A motor engages the stacked disk assembly for rotating the stacked disk assembly in the housing. A fuel flow pathway is provided in the housing for distributing a fuel to the electrochemical cells. An oxidant flow pathway is provided in the housing and physically separated from the fuel flow pathway for distributing an oxidant to the electrochemical cells. The invention is further directed to a method of fabricating a fuel cell.

BRIEF DESCRIPTION OF THE DRAWINGS

The invention will now be described, by way of example, with reference to the accompanying drawings, in which.

DETAILED DESCRIPTION OF THE INVENTION

Figure 1:
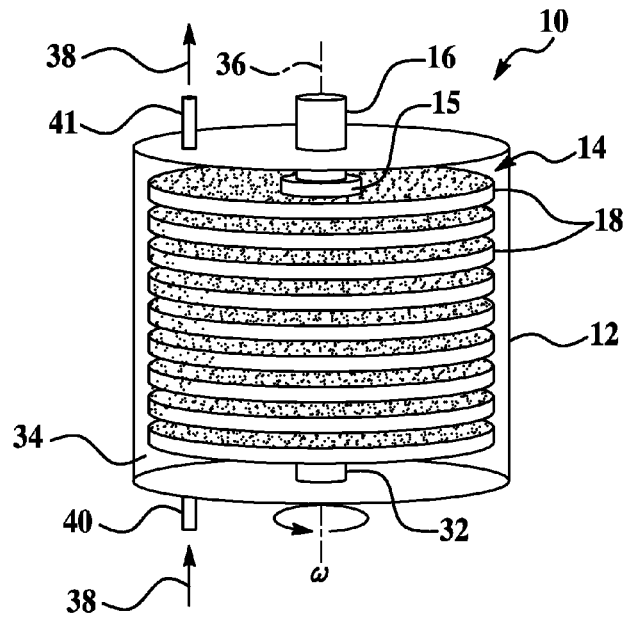
FIG. 1 is a perspective schematic view of an illustrative embodiment of the spinning electrode fuel cell according to the present invention.

Referring next to the drawings, an illustrative embodiment of a spinning electrode fuel cell according to the present invention is generally indicated by reference numeral 10 in FIG. 1. The spinning electrode fuel cell 10 typically includes a housing 12 which may be cylindrical, as shown, and contains a stacked disk assembly 14. A fuel inlet 16 is provided at one end of the housing 12 for distributing a fuel 36 containing hydrogen, for example, into the stacked disk assembly 14. A fuel outlet 32 is provided at the opposite end of the housing 12 for distributing unreacted fuel from the stacked disk assembly 14. As shown in FIG. 1, an oxidant inlet 40 and an oxidant exhaust outlet 41 are further provided in the housing 12 for distributing an oxidant 38 containing oxygen into the housing 12 and distributing excess oxidant 38 with exhaust water from the housing 12, respectively.

Figure 2:
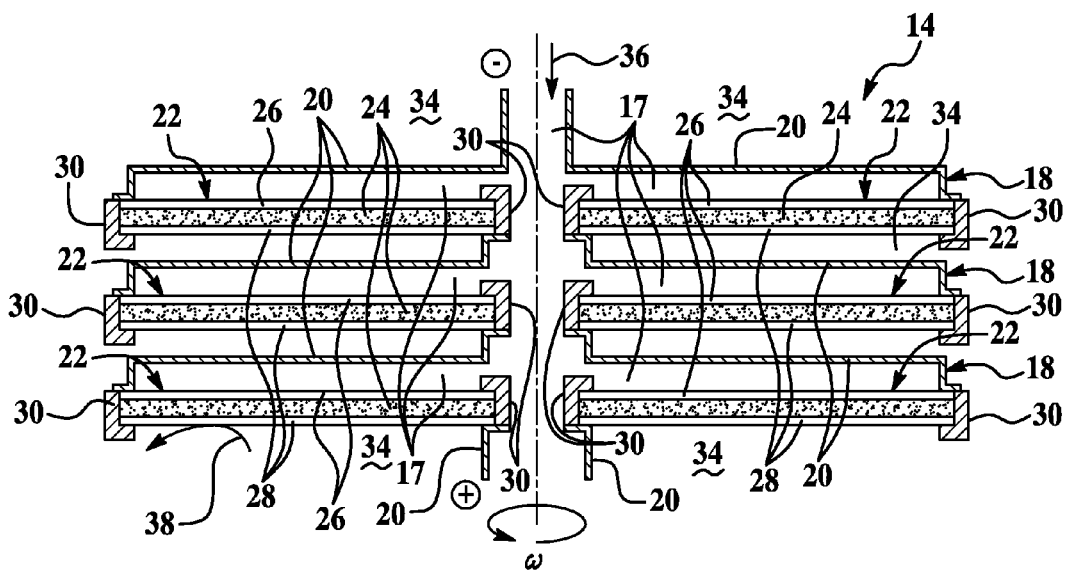
FIG. 2 is a sectional view of a stacked disk assembly of the spinning electrode fuel cell according to the present invention.

As shown in FIG. 2, the stacked disk assembly 14 includes multiple electrochemical cells 18 which may be generally disk-shaped and are electrically connected to each other in series to form a stacked configuration. Each electrochemical cell 18 includes a reservoir plate 20 which acts as a physical barrier between a fuel gas flow pathway 17 and an oxidant flow pathway 34 on the interior and exterior, respectively, of the stacked disk assembly 14. At respective ends of the stacked disk assembly 14, the fuel flow pathway 17 is provided in fluid communication with the fuel inlet 16 and the fuel outlet 32. Furthermore, the oxidant flow pathway 34 is provided in fluid communication with the oxidant inlet 40 and exhaust outlet 41 which may be at respective ends of the stacked disk assembly 14, as shown in FIG. 1.

Each electrochemical cell 18 further includes a membrane electrode assembly (MEA) 22 which is attached to the reservoir plate 20. The fuel flow pathway 17 typically extends between the reservoir plate 20 and the MEA 22 of each electrochemical cell 18. The oxidant flow pathway 34 typically extends between the MEA 22 of each electrochemical cell 18 and the reservoir plate 20 of the adjacent electrochemical cell 18. The MEA 22 typically includes a porous support plate (not shown) to which is attached a proton permeable membrane 24 that is sandwiched between a positive (anode) catalyst layer 26 and a negative (cathode) catalyst layer 28. Preferably, the positive catalyst layer 26 is exposed to the fuel flow pathway 17, whereas the negative catalyst layer 28 is exposed to the oxidant flow pathway 34. Radial insulators 30 contact either the anodic current collector (for the negative electrode) or the cathodic current collector (for the positive electrode) and also provide a seal between the fuel flow pathway 17 and the oxidant flow pathway 34. The MEA assembly 22 is multi-functional, providing a mechanical foundation, a bipolar collection medium, an ion transport mechanism and a catalyst for both the anode and the cathode of each electrochemical cell 18. Throughout the length of the stacked disk assembly 14, the MEA 22 of each electrochemical cell 18 is connected to the reservoir plate 20 of the adjacent electrochemical cell 18 in the series.

It will be understood that the positions of the fuel flow pathway 17 and the oxidant flow pathway 34 in and around, respectively, the stacked disk assembly 14 may be reversed such that the fuel flow pathway 17 is outside and the oxidant flow pathway 34 is inside the stacked disk assembly 14. In that case, the positions of the positive catalyst layer 26 and the negative catalyst layer 28 would be reversed with respect to their respective positions shown in FIG. 2. Furthermore, the fuel inlet 16 shown in FIG. 1 would become the oxidant inlet for distribution of the oxidant into the housing 12.

The support plate (not shown) of each MEA 22 may be a carbon or coated metal plate which is designed to meet the requirements of optimum mechanical strength and electrical conductivity. The support plate may also be manufactured with appropriate indentations and patterns to increase turbulence and reduce barrier layers. The MEA 22 may be formed as a sandwich construction in which the support plate, positive catalyst layer 26, membrane 24 and negative catalyst layer 28 are arranged and pressed together. Alternatively, the MEA. 22 may be formed as a series of catalysts and components which are sequentially cast or painted onto the support plate, as is known to those skilled in the art.

The stacked disk assembly 14 is mounted for rotation inside the housing 12 according to the knowledge of those skilled in the art. A motor 15 engages the stacked disk assembly 14 for rotation of the stacked disk assembly 14 in the housing 12. The MEAs 22 and the reservoir plates 20 of the electrochemical cells 18 are radially concentric, such that the entire stacked disk assembly 14 can be rotated inside the housing 12 at a high angular speed $\omega$. Due to the current-collecting configuration of the stacked disk assembly 14, one end of the stacked disk assembly 14 is positively-charged whereas the opposite end of the stacked disk assembly 14 is negatively-charged, as shown in FIG. 2. Electrical current may be removed from the rotating stacked disk assembly 14 using brushes (not shown) or other conventional means known to those skilled in the art.

In FIGS. 1 and 2, each of the MEA/support plate assemblies 22 is shown as a plate. However, it will be appreciated by those skilled in the art that the MEA/support plate assemblies 22 may alternatively be formed in the configuration of an annular ring (not shown), in which case each MEA/support plate assembly 22 has a reduced active surface area and a uniform velocity field.

In operation of the spinning electrode fuel cell 10, the motor 15 rotates the stacked disk assembly 14, as indicated by the arrow in FIG. 2. A fuel 36, which may be a gas or liquid containing hydrogen, for example, is distributed into the fuel flow pathway 17 through the fuel inlet 16 of the spinning electrode fuel cell 10. Simultaneously, an oxidant 38, which may be a gas or liquid containing oxygen, for example, is distributed into the oxidant gas flow pathway 34 through the oxidant inlet 40 from outside the housing 12. In the fuel flow pathway 17, the fuel 36 contacts the positive catalyst layer 26 of each MEA 22. Accordingly, electrons are harvested from the fuel 36 as the fuel 36 is oxidized. The harvested electrons are distributed through an external circuit (not shown), such as an electric drive motor (not shown) of a fuel cell vehicle, for example. The protons pass through the membrane 24 to the negative catalyst layer 28 of the MEA 22. As it flows into the housing 12 through the oxidant inlet 40, the oxidant 38 successively contacts the negative catalyst layer 28 of each MEA 22 by flowing around the radial insulator 30 of one MEA 22 and into the gap between the reservoir plate 20 of that MEA 22 and the negative catalyst layer 28 of the next adjacent MEA 22. At the negative catalyst layer 28, electrons returning from the external circuit combine with the protons from the membrane 24 and oxygen in the oxidant 38 to form water as a by-product. The exhaust water is distributed from the oxidant flow pathway 34 and discharged from the housing 12 through the oxidant exhaust outlet 41 provided in the housing 12.

The stacked disk assembly 14 may be oriented in a vertical orientation, as shown, or in a horizontal orientation (not shown) for optimum space utilization; however, a horizontal orientation would provide advantages of simplified immobilization of the fuel if a liquid fuel were used. Delivery of the fuel 36 or the oxidant 38 throughout the stacked disk assembly 14 may be enhanced with appropriate fins (not shown) provided on the rotating stacked disk assembly 14 in order to reduce or eliminate the need for a secondary fluid handling system. A liquid seal (not shown), combined with a float valve (not shown) for the introduction of gas, may be used to maintain fuel pressure within the stacked disk assembly 14 as well as to separate the fuel 36 from the oxidant 38.

It will be appreciated by those skilled in the art that the spinning electrode fuel cell 10 according to the present invention has a number of advantages. For example, transport of the fuel and oxidant is conducted at high cross-section/low velocity as compared to a conventional restricted flow field, thereby reducing pressure drop and gas pumping inefficiencies. Furthermore, the active materials are supplied in a nearly parallel manner, minimizing catalyst utilization problems where fuel and oxidant gradients lead to preferential degradation near the inlet or the outlet of the fuel cell. The angular velocity of the stacked disk assembly is adjustable to optimize power requirements (faster rotation favors higher currents), but this not necessary. This facilitates an advantage in the ability to provide rapid transient response. Oxidative by-product management is improved through the centrifugal action of the rotating stacked disk assembly 14. For example, liquid water would be driven from the MEAs under rotating action, eliminating common problems associated with liquid water build-up such as catalytic site and gas channel blockage. The fin design, coupled with a minimization of the gas diffusion layer and membrane resistance, allows efficient low-pressure drop cooling of the MEA, thus eliminating the need for a dedicated heat-exchange system. The fuel cell is inherently manufacturable, using largely stamped parts and crimped welds, both of which are well-known in the art. The fuel cell is compatible with both gaseous and liquid media.

While the preferred embodiments of the invention have been described above, it will be recognized and understood that various modifications can be made in the invention and the appended claims are intended to cover all such modifications which may fall within the spirit and scope of the invention.

What is claimed is:
1. A fuel cell comprising:
   a housing;
   a stacked disk assembly rotatably mounted in said housing and comprising a plurality of electrochemical cells connected to each other;

a plurality of reservoir plates provided between adjacent ones of said plurality of electrochemical cells, respectively;

a motor engaging said stacked disk assembly for rotating said stacked disk assembly in said housing;

a fuel flow pathway provided in said housing and at least partially defined by said plurality of reservoir plates for distributing a fuel to said plurality of electrochemical cells; and an oxidant flow pathway provided in said housing and physically separated from said fuel flow pathway and at least partially defined by said plurality of reservoir plates for distributing an oxidant to said plurality of electrochemical cells.

2. The fuel cell of claim 1 wherein each of said plurality of electrochemical cells comprises a corresponding one of said plurality of reservoir plates and a membrane electrode assembly carried by said corresponding one of said plurality of reservoir plates.

3. The fuel cell of claim 2 further comprising at least one radial insulator engaging said corresponding one of said plurality of reservoir plates and said membrane electrode assembly.

4. The fuel cell of claim 3 wherein said at least one radial insulator comprises a pair of radial insulators.

5. The fuel cell of claim 2 wherein said membrane electrode assembly comprises a positive catalyst layer, a negative catalyst layer and a proton permeable membrane sandwiched between said positive catalyst layer and said negative catalyst layer.

6. The fuel cell of claim 5 wherein said positive catalyst layer is exposed to said fuel flow pathway and said negative catalyst layer is exposed to said oxidant flow pathway.

7. The fuel cell of claim 5 wherein said positive catalyst layer and said negative catalyst layer are painted on said membrane.

8. The fuel cell of claim 5 wherein said positive catalyst layer, said membrane and said negative catalyst layer are compressed together.

9. A fuel cell comprising:

a housing;

a stacked disk assembly rotatably mounted in said housing and comprising a plurality of electrochemical cells connected to each other;

a motor engaging said stacked disk assembly for rotating said stacked disk assembly in said housing;

a fuel flow pathway, provided in said stacked disk assembly for distributing a fuel to said plurality of electrochemical cells;

an oxidant flow pathway provided outside said stacked disk assembly and physically separated from said fuel flow pathway for distributing an oxidant to said plurality of electrochemical cells;

wherein each of said plurality of electrochemical cells comprises a radially-extending reservoir plate and a radially-extending membrane electrode assembly carried by said reservoir plate; and wherein said reservoir plate of each of said electrochemical cells engages said membrane electrode assembly of an adjacent one of said electrochemical cells.

10. The fuel cell of claim 9 further comprising a plurality of radial insulators engaging said reservoir plate and said membrane electrode assembly.

11. The fuel cell of claim 9 wherein said membrane electrode assembly comprises a positive catalyst layer, a negative catalyst layer and a proton permeable membrane sandwiched between said positive catalyst layer and said negative catalyst layer.

12. The fuel cell of claim 9 wherein said fuel flow pathway extends between said reservoir plate and said membrane electrode assembly of each of said electrochemical cells and said oxidant flow pathway extends between said membrane electrode assembly of each of said electrochemical cells and said reservoir plate of an adjacent one of said electrochemical cells.

13. The fuel cell of claim 12 wherein said membrane electrode assembly comprises a positive catalyst layer exposed to said fuel flow pathway, a negative catalyst layer exposed to said oxidant flow pathway and a proton permeable membrane sandwiched between said positive catalyst layer and said negative catalyst layer.

* * * * *